US012789650B2

(12) United States Patent
Asami

(10) Patent No.: US 12,789,650 B2
(45) Date of Patent: Nov. 10, 2026

(54) CONTACTLESS POWER TRANSMISSION SYSTEM

(71) Applicant: HONDA MOTOR CO., LTD., Tokyo (JP)

(72) Inventor: Kiyoshi Asami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 18/583,926

(22) Filed: Feb. 22, 2024

(65) Prior Publication Data

US 2024/0326616 A1 Oct. 3, 2024

(30) Foreign Application Priority Data

Mar. 27, 2023 (JP) ................................ 2023-050158

(51) Int. Cl.
*B60L 53/122* (2019.01)
*H02J 7/82* (2026.01)
*H02J 50/12* (2016.01)

(52) U.S. Cl.
CPC .............. *B60L 53/122* (2019.02); *H02J 7/82* (2026.01); *H02J 50/12* (2016.02); *B60L 2210/30* (2013.01)

(58) Field of Classification Search
CPC ............ H02J 50/12; H02J 17/00; H02J 5/005; H02J 7/025; B60L 53/12–126; B60L 11/182;

(Continued)

(56) References Cited

U.S. PATENT DOCUMENTS

2015/0224883 A1* 8/2015 Ichikawa ................ B60L 50/51 320/108
2016/0052415 A1* 2/2016 Bell ........................ H02J 50/90 320/108

(Continued)

FOREIGN PATENT DOCUMENTS

JP 2013-090360 5/2013
JP 2018-186630 11/2018

(Continued)

OTHER PUBLICATIONS

Japanese Notice of Allowance for Japanese Patent Application No. 2023-050158 mailed Oct. 15, 2024.

*Primary Examiner* — Rexford N Barnie
*Assistant Examiner* — Terrence R Willoughby
(74) *Attorney, Agent, or Firm* — Amin, Turocy & Watson, LLP

(57) ABSTRACT

A contactless power transmission system includes a power reception unit configured to receive AC power contactlessly transmitted from a power transmission device, a power conversion unit configured to convert the AC power into DC power, a power storage device connected to the power conversion unit, a rotating electric machine configured to generate a traveling driving force of a vehicle and to transmit and receive power to and from the power storage device, and a control device configured to control an operation of the power conversion unit and power transmission and reception between the power storage device and the rotating electric machine, wherein the control device restricts reception of the AC power by the power reception unit when a state of charge of the power storage device is larger than a predetermined threshold value, and changes the predetermined threshold value to decrease as a speed of the vehicle increases.

4 Claims, 4 Drawing Sheets

(58) Field of Classification Search
CPC ....... H01F 38/14; H01F 2038/143–146; Y02T 90/122
See application file for complete search history.

(56) References Cited

U.S. PATENT DOCUMENTS

| | | | | |
|---|---|---|---|---|
| 2016/0167641 | A1* | 6/2016 | Yoon .................. | G08G 1/09623 903/903 |
| 2016/0244044 | A1* | 8/2016 | Miller ............... | B60W 50/0097 |
| 2018/0312080 | A1* | 11/2018 | Beaver ................ | B60L 15/2045 |
| 2018/0339694 | A1 | 11/2018 | Zhang et al. | |
| 2022/0126825 | A1 | 4/2022 | March et al. | |
| 2022/0402394 | A1* | 12/2022 | Okazaki .................. | H02J 50/90 |
| 2023/0187983 | A1* | 6/2023 | Nakao ..................... | H02J 50/12 307/104 |

FOREIGN PATENT DOCUMENTS

| | | |
|---|---|---|
| JP | 2019-213385 | 12/2019 |
| JP | 2021-078292 | 5/2021 |
| JP | 2023-017352 | 2/2023 |

* cited by examiner

CONTACTLESS POWER TRANSMISSION SYSTEM

CROSS-REFERENCE TO RELATED APPLICATION

Priority is claimed on Japanese Patent Application No. 2023-050158, filed Mar. 27, 2023, the content of which is incorporated herein by reference.

BACKGROUND OF THE INVENTION

Field of the Invention

The present invention relates to a contactless power transmission system.

Description of Related Art

In recent years, research and development has been being conducted on charging and supplying power to vehicles equipped with secondary batteries that contribute to energy efficiency to ensure more people have access to affordable, reliable, sustainable and advanced energy.

Conventionally, in contactless power transmission systems which supply power from outside a vehicle to the vehicle through contactless power transmission, a system that controls start and stop of power transmission according to a charging rate of a power storage device in a power transmission section so that the charging rate of the power storage device becomes a predetermined value or higher at an end position of the power transmission section is known (for example, refer to Patent Document 1 below).

[Patent Document 1] Japanese Unexamined Patent Application, First Publication No. 2018-186630

SUMMARY OF THE INVENTION

Incidentally, in the technology related to charging and supplying in a vehicle equipped with a secondary battery, it is desired to curb an increase in energy loss in the entire vehicle. For example, in a contactless power transmission system such as the above-described conventional technology, there is a possibility that regenerative power generated after passing through the power transmission section cannot be stored in the power storage device when setting the charging rate of the power storage device to a predetermined value or higher at the end position of the power transmission section regardless of a driving state of the vehicle. When all of the regenerative power generated after passing through the power transmission section cannot be stored in the power storage device, it would be necessary to release the regenerative power to the outside as heat, resulting in a problem that the energy efficiency of the entire vehicle would decrease.

Aspects of the present invention have been made in view of the above problems, and an object of the present invention is to provide a contactless power transmission system capable of curbing an increase in energy loss in an entire system. Furthermore, it contributes to energy efficiency.

In order to solve the above problems and achieve the objects, the present invention employs the following aspects.

(1): A contactless power transmission system according to an aspect of the present invention includes a power reception unit configured to receive AC power contactlessly transmitted from a power transmission device, a power conversion unit configured to convert the AC power received by the power reception unit into DC power, a power storage device connected to the power conversion unit, a rotating electric machine configured to generate a traveling driving force of a vehicle and to transmit and receive power to and from the power storage device, and a control device configured to control an operation of the power conversion unit and power transmission and reception between the power storage device and the rotating electric machine, wherein the control device restricts reception of the AC power by the power reception unit when a state of charge of the power storage device is larger than a predetermined threshold value, and changes the predetermined threshold value to decrease as a speed of the vehicle increases.

(2): In the aspect (1), the control device may make a power balance at input and output terminals of the power storage device zero, and may match power received by the power reception unit with power required for the traveling driving force.

(3): In the aspect (1) or (2), the control device may restrict reception of the AC power by short-circuiting of the power reception unit.

According to the aspect (1), deceleration regenerative energy obtained by a regenerative operation of the rotating electric machine when the vehicle decelerates can be stored in the power storage device by providing the control device that changes a predetermined threshold value set for the state of charge of the power storage device to decrease as the speed of the vehicle increases. For example, an increase in energy loss in the entire system can be curbed without need to release the deceleration regenerative energy as heat.

In the case of the aspect (2), it is possible to curb occurrence of problems such as heat generation and shortened lifespan of the power storage device by setting the power transmission from the power transmission device to a virtual SOC, in addition to the state of charge (SOC) of the power storage device.

In the case of the aspect (3), a current in the power transmission device on the primary side can be controlled by the power reception unit and the power conversion unit on the secondary side, and independent power control can be performed on the secondary side.

DETAILED DESCRIPTION OF THE INVENTION

Hereinafter, a contactless power transmission system according to an embodiment of the present invention will be described with reference to the accompanying drawings.

Figure 1:
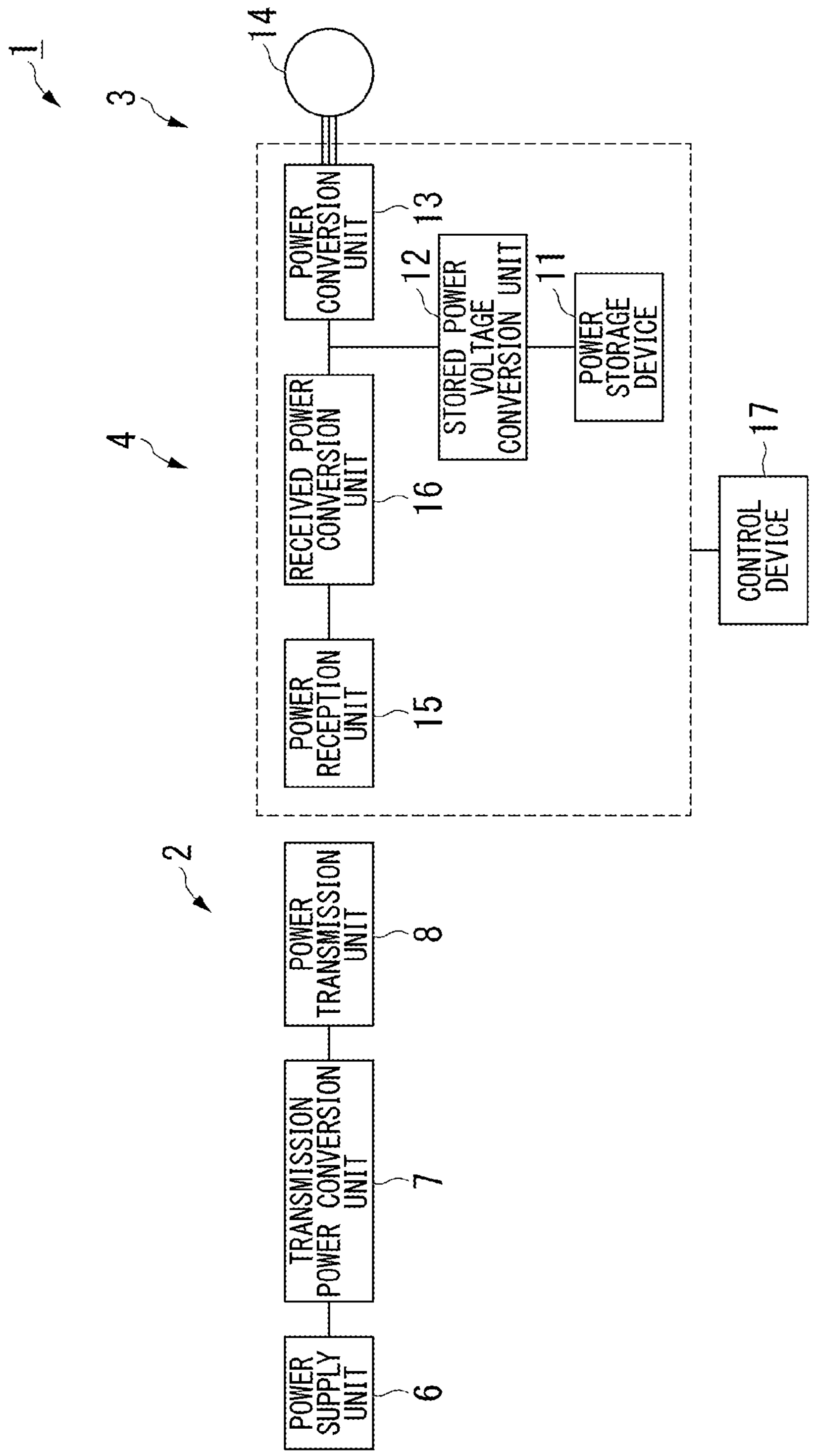
FIG. 1 is a diagram showing a configuration of a contactless power transmission system according to an embodiment of the present invention.
Figure 2:
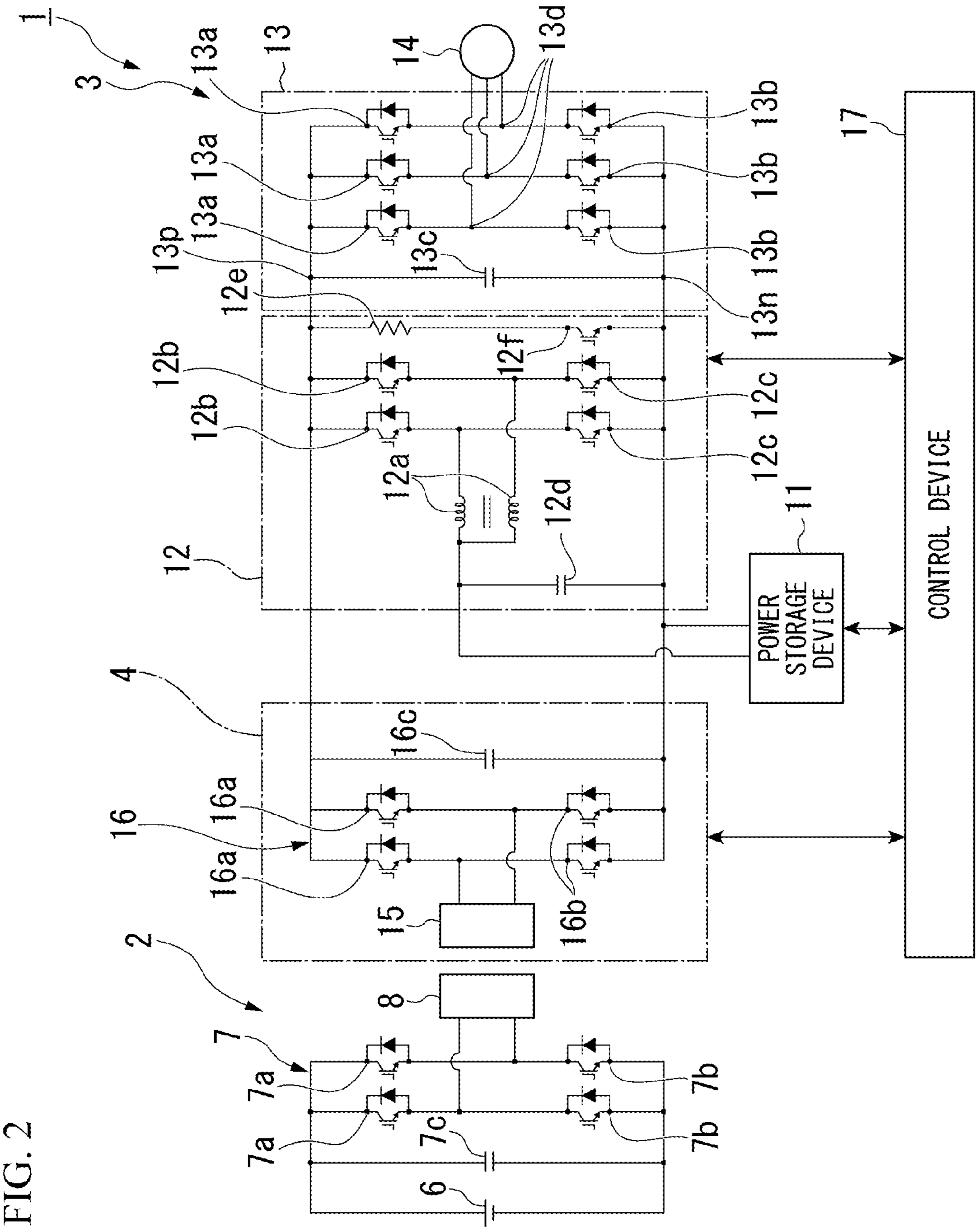
FIG. 2 is a diagram showing details of the configuration of the contactless power transmission system according to the embodiment of the present invention.
Figure 3:
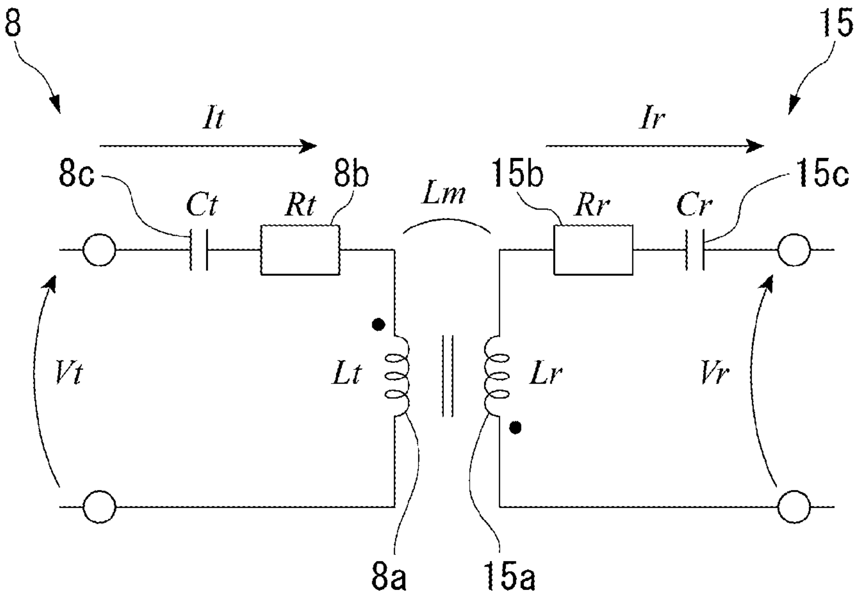
FIG. 3 is a diagram showing a configuration of a power transmission unit and a power reception unit in the contactless power transmission system according to the embodiment of the present invention.

FIGS. 1 and 2 are diagrams showing a configuration of a contactless power transmission system 1 according to an embodiment. FIG. 3 is a diagram showing a configuration of a power transmission unit 8 and a power reception unit 15 of the contactless power transmission system 1 in the embodiment.

The contactless power transmission system 1 of the embodiment supplies power to a movable body such as a vehicle from the outside of the movable body by, for example, contactless power transmission. The vehicle is, for example, an electric motor vehicle such as an electric vehicle, a hybrid vehicle, or a fuel cell vehicle.

(Contactless Power Transmission System)

As shown in FIGS. 1 and 2, the contactless power transmission system 1 according to the embodiment includes, for example, a power transmission device 2 mounted on a vehicle travel path, and a drive control device 3 and a power reception device 4 mounted in a movable body such as a vehicle. The movable body is a vehicle or the like that generates at least deceleration regenerative energy. The contactless power transmission system 1 of the embodiment may include at least only components (for example, the drive control device 3 and the power reception device 4) that are mounted in the movable body, and may perform contactless power transmission by a combination of a component outside the mobile body (for example, the power transmission device 2) and the contactless power transmission system 1 mounted in the movable body.

The power transmission device 2 includes, for example, a power supply unit 6, a transmission power conversion unit 7, and a power transmission unit 8. The power transmission device 2 may include at least a plurality of power transmission units 8 in a predetermined power transmission section on a vehicle travel path, for example.

The power supply unit 6 includes, for example, an AC power source such as a commercial power source, an AC-DC converter that converts AC power into DC power, and a capacitor for power smoothing. The power supply unit 6 converts AC power supplied from the AC power source into DC power using the AC-DC converter.

The transmission power conversion unit 7 includes, for example, an inverter that converts DC power into AC power. The inverter of the transmission power conversion unit 7 includes, for example, a bridge circuit formed by a plurality of switching elements and rectifying elements that are bridge-connected in two phases, and a capacitor for voltage smoothing. Each of the switching elements is, for example, a transistor such as a metal oxide semi-conductor field effect transistor (MOSFET) of silicon carbide (SIC). The plurality of switching elements are high side arm and low side arm transistors 7*a* and 7*b* that form a pair in each of the phases. Each of the rectifying elements is, for example, a free wheel diode connected in parallel to each of the transistors 7*a* and 7*b*. A capacitor for voltage smoothing 7*c* is connected in parallel to the bridge circuit.

The power transmission unit 8 transmits power by changing a high-frequency magnetic field, for example, by magnetic field coupling such as magnetic resonance or electromagnetic induction. As shown in FIG. 3, the power transmission unit 8 includes, for example, a resonant circuit formed by a primary coil 8*a*, a primary resistor 8*b*, and a primary capacitor 8*c* connected in series. The power transmission unit 8 includes, for example, a sensor such as a current sensor that detects a current It flowing through the resonant circuit.

For example, the power transmission device 2 transmits power to the power reception device 4 of the vehicle by controlling ON (conductivity) and OFF (cutting off) switching of each of the switching elements of the transmission power conversion unit 7 according to information of a preset drive frequency or a required frequency received from the power reception device 4.

As shown in FIGS. 1 and 2, the drive control device 3 of the movable body such as a vehicle includes, for example, a power storage device 11, a stored power voltage conversion unit 12, a power conversion unit 13, and a rotating electric machine 14. The power reception device 4 of the movable body includes, for example, a power reception unit 15 and a received power conversion unit 16. The drive control device 3 and the power reception device 4 include, for example, a common control device 17.

For example, in the case of an electric vehicle or the like that is driven using the power storage device 11 as a power source, the drive control device 3 does not need to include the stored power voltage conversion unit 12. For example, in the case of a hybrid vehicle or the like that is driven using the power storage device 11 and an internal combustion engine as power sources, the drive control device 3 may include the power stored power voltage conversion unit 12.

The power storage device 11 is connected to the stored power voltage conversion unit 12. The power storage device 11 is charged by power transmitted contactlessly from the power transmission device 2 outside the vehicle. The power storage device 11 transmits and receives power to and from the rotating electric machine 14 via the stored power voltage conversion unit 12 and the power conversion unit 13.

The power storage device 11 includes, for example, a battery such as a lithium ion battery, a current sensor that detects a current of the battery, and a voltage sensor that detects a voltage of the battery.

For example, when an electric vehicle or the like does not include the stored power voltage conversion unit 12, the power storage device 11 is connected to the power conversion unit 13 and the received power conversion unit 16 which will be described below.

The stored power voltage conversion unit 12 is connected to the power conversion unit 13 and the received power conversion unit 16. The stored power voltage conversion unit 12 includes, for example, a voltage controller that performs bidirectional voltage conversion of step-up and step-down. The voltage controller converts input power and output power during charging and discharging of the power storage device 11 by bidirectional voltage conversion. The voltage controller of the stored power voltage conversion unit 12 includes, for example, a pair of first reactors, a first element module, and a capacitor for voltage smoothing.

The pair of first reactors 12*a* and 12*a* form a composite reactor by being magnetically coupled to each other with opposite polarities. The pair of first reactors 12*a* and 12*a* are connected to a connection point between a high side arm and a low side arm of each phase of the first element module.

The first element module includes a first bridge circuit formed by, for example, a plurality of switching elements and rectifier elements that are bridge-connected in two phases. Each of the switching elements is, for example, a transistor such as a MOSFET of SiC. The plurality of switching elements are high side arm and low side arm transistors 12*b* and 12*c* that form a pair in each of the phases.

Each of the rectifying element is, for example, a free wheel diode connected in parallel to each of the transistors 12*b* and 12*c*. The capacitor 12*d* for voltage smoothing is connected in parallel to the power storage device 11.

The stored power voltage conversion unit 12 includes a resistor 12*e* and a transistor 12*f* that are connected in series. The resistor 12*e* and the transistor 12*f* are connected in parallel to the first bridge circuit.

The pair of first reactors 12*a* and 12*a* and the first element module of the voltage controller perform voltage conversion by so-called two-phase interleaving. In the two-phase interleaving, one period of switching control of first phase transistors 12*b* and 12*c* and one period of switching control of second phase transistors 12*b* and 12*c* among the two-phase transistors 12*b* and 12*c* connected to the pair of first reactors 12*a* and 12*a* are shifted from each other by a half period.

The power conversion unit 13 is connected to the rotating electrical machine 14. The power conversion unit 13 includes, for example, a power converter that converts between DC power and AC power. The power converter includes, for example, a second element module and a capacitor for voltage smoothing.

The second element module includes, for example, a second bridge circuit formed by a plurality of switching elements and rectifying elements that are bridge-connected in three phases. Each of the switching elements is, for example, a transistor such as a MOSFET of SiC. The plurality of switching elements are high side arm and low side arm transistors 13*a* and 13*b* that form a pair in each of the phases. Each of the rectifying elements is, for example, a free wheel diode connected in parallel to each of the transistors 13*a* and 13*b*. A capacitor 13*c* for voltage smoothing is connected in parallel to the second bridge circuit.

The second element module controls an operation of the rotating electric machine 14 by transmitting and receiving electric power. For example, during power running of the rotating electrical machine 14, the second element module converts DC power input from positive and negative DC terminals 13*p* and 13*n* into three-phase AC power, and supplies the three-phase AC power to the rotating electric machine 14 from a three-phase AC terminal 13*d*. The second element module generates a rotational driving force by sequentially commutating a current to three-phase stator windings of the rotating electric machine 14.

For example, during regeneration of the rotating electric machine 14, the second element module converts three-phase AC power input from the three-phase stator windings into DC power by turning ON (conductivity) and OFF (cutting off) the switching elements of each of the phases synchronized with rotation of the rotating electric machine 14. The second element module can supply DC power converted from three-phase AC power to the power storage device 11 via the stored power voltage conversion unit 12.

The rotating electric machine 14 is, for example, a three-phase AC brushless DC motor provided for driving a vehicle. The rotating electric machine 14 includes a rotor having a permanent magnet for a field, and a stator having three-phase stator windings which generate a rotating magnetic field that rotates the rotor. The three-phase stator windings are connected to the three-phase AC terminals 13*d* of the power conversion unit 13.

The rotating electric machine 14 generates a rotational driving force by performing a power-running operation using power supplied from the power conversion unit 13. For example, when the rotating electric machine 14 can be connected to wheels of a vehicle, it generates a running driving force by performing a power-running operation with power supplied from the power conversion unit 13. The rotating electric machine 14 may generate power by performing a regenerative operation using rotational power input from the wheels of the vehicle. When the rotating electrical machine 14 can be connected to an internal combustion engine of a vehicle, it may generate electricity using power of the internal combustion engine.

The power reception unit 15 is connected to the received power conversion unit 16. The power reception unit 15 receives power through changes in the high-frequency magnetic field transmitted from the power transmission unit 8, for example, by magnetic field coupling such as magnetic resonance or electromagnetic induction. As shown in FIG. 3, the power reception unit 15 includes a resonant circuit formed by, for example, a secondary coil 15*a*, a secondary resistor 15*b*, and a secondary capacitor 15*c* connected in series. The power reception unit 15 includes, for example, a sensor such as a current sensor that detects a current Ir flowing through the resonant circuit.

The received power conversion unit 16 shown in FIGS. 1 and 2 is connected to the power conversion unit 13. The received power conversion unit 16 includes a so-called full bridgeless type (or bridgeless and totem pole type) power factor correction (PFC) circuit that converts AC power into DC power. A so-called bridgeless PFC is a PFC that does not include a bridge rectifier using a plurality of diodes that are bridge-connected, and a so-called totem pole PFC is a PFC that includes a pair of switching elements of the same conductivity type that are connected in series in the same direction (totem pole connection).

The received power conversion unit 16 includes, for example, a third bridge circuit formed by a plurality of switching elements and rectifying elements that are bridge-connected in two phases, and a capacitor for voltage smoothing. Each of the switching elements is, for example, a transistor such as a MOSFET of SiC. The plurality of switching elements are high side arm and low side arm transistors 16*a* and 16*b* that form a pair in each of the phases. Each of the rectifying elements is, for example, a free wheel diode connected in parallel to each of the transistors 16*a* and 16*b*. A capacitor for voltage smoothing 16*c* is connected in parallel to the third bridge circuit.

For example, the power reception device 4 including the power reception unit 15 and the received power conversion unit 16 receives power transmitted from the power transmission device 2 by controlling the ON (conduction) and OFF (cutting off) switching of each of the switching elements of the received power conversion unit 16 according to information of the frequency of power transmission by the power transmission device 2.

The control device 17 integrally controls, for example, the drive control device 3 and the power reception device 4 of a movable body such as a vehicle. The control device 17 is a software functional unit that functions by executing a predetermined program by a processor such as a central processing unit (CPU). The software function unit is an ECU that includes a processor such as a CPU, a read only memory (ROM) that stores programs, a random access memory (RAM) that temporarily stores data, and an electronic circuit such as a timer. At least a part of the control device 17 may be an integrated circuit such as a large scale integration (LSI).

The control device 17 generates, for example, a control signal indicating a timing for driving the ON (conduction) and OFF (cutting off) of each of the switching elements and generates a gate signal for actually driving each of the switching elements on and off on the basis of the control signal.

For example, the control device 17 improves a power factor of an input voltage and an input current while rectifying AC power received from the power transmission device 2 into DC power by controlling the switching of each of the switching elements of the power reception device 4.

For example, the control device 17 controls an output according to a target output by a synchronous rectification operation that synchronously turns on and off the plurality of switching elements of the power reception device 4 and a short-circuiting operation that short-circuits the secondary coil 15*a*.

For example, the control device 17 controls the synchronous rectification operation according to a magnitude and phase of a current generated in the power reception unit 15 by the power sent from the power transmission device 2, that is, a current Ir flowing through the secondary coil 15*a*. The control device 17 controls the plurality of switching elements of the received power conversion unit 16 by soft switching of so-called zero voltage switching (ZVS). In the zero voltage switching (ZVS), each of the switching elements is turned on (switched from an off state to an on state) after a voltage across both ends thereof is reduced to zero by discharging an output capacitance (a parasitic capacitance) in the off state during a dead time period of each phase.

For example, the control device 17 controls the short-circuiting operation by turning on only the low side arm of each of the phases while continuing the synchronous rectification operation of the zero voltage switching (ZVS) with the high side arm of each of the phases of the received power conversion unit 16.

For example, the control device 17 restricts reception of AC power by the power reception device 4 when a state of charge (SOC) of the power storage device 11 is larger than a predetermined threshold value. The control device 17 changes the predetermined threshold value for the state of charge (SOC) to decrease as a speed of the movable body (for example, a vehicle speed that is a speed of a vehicle, or the like) in which the power reception device 4 and the power storage device 11 are mounted increases.

Figure 4:
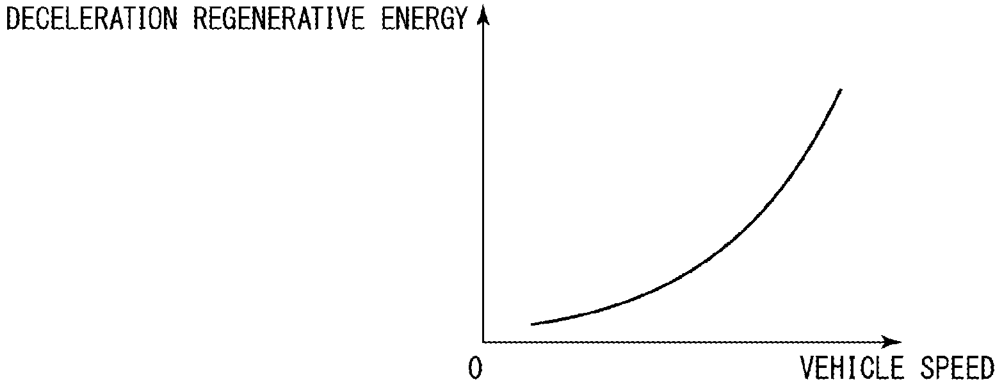
FIG. 4 is a graph diagram showing an example of correspondence between vehicle speed and deceleration regenerative energy in the contactless power transmission system according to the embodiment of the present invention.
Figure 5:
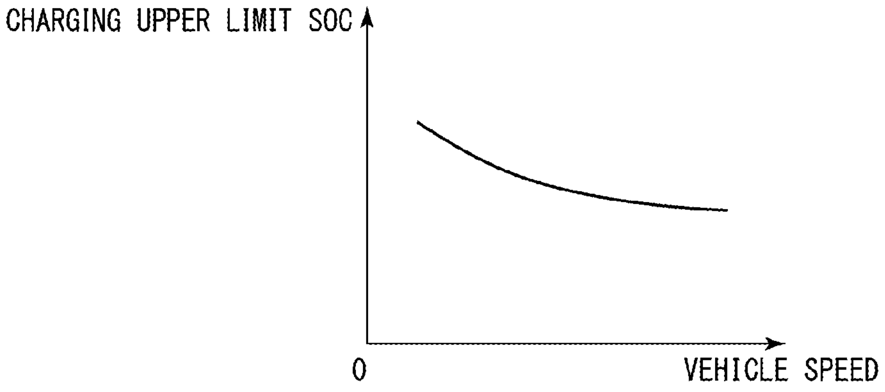
FIG. 5 is a graph diagram showing an example of correspondence between vehicle speed and charging upper limit SOC in the contactless power transmission system according to the embodiment of the present invention.

FIG. 4 is a graph diagram showing an example of correspondence between vehicle speed and deceleration regenerative energy in the contactless power transmission system 1 of the embodiment. FIG. 5 is a graph diagram showing an example of correspondence between vehicle speed and charging upper limit SOC in the contactless power transmission system 1 of the embodiment.

As shown in FIG. 4, as the vehicle speed increases, the deceleration regenerative energy obtained by the regenerative operation of the rotating electric machine 14 when the vehicle decelerates changes to increase. For example, as shown in FIG. 5, the control device 17 changes an upper limit value of the state of charge (SOC) (the charging upper limit SOC) of the power storage device 11 to decrease as the vehicle speed increases so that all of the deceleration regenerative energy can be stored in the power storage device 11.

When the state of charge (SOC) of the power storage device 11 is restricted, the control device 17 lowers the state of charge (SOC) below the charging upper limit SOC or maintains the state of charge (SOC), for example. For example, when the state of charge (SOC) is maintained, the control device 17 makes a power balance at the input and output terminals of the power storage device 11 zero, and matches the power received by the power reception unit 15 with the power required to drive the vehicle. The control device 17 calculates the power required to drive the vehicle on the basis of, for example, outputs of various sensors related to a traveling state of the vehicle or a state of the rotating electric machine 14. The various sensors include, for example, a speed sensor that detects the speed of the vehicle, an accelerator position sensor that detects an amount of operation of an accelerator, and the like, and a current sensor, a voltage sensor, a temperature sensor, and the like that grasp the state of the rotating electric machine 14.

When the power received by the power reception unit 15 is restricted, the control device 17 instructs the power transmission device 2 to stop power generation or reduce output, or instructs the power transmission device 2 to perform a short-circuiting operation that short-circuits the secondary coil 15*a* of the power reception device 4.

As described above, according to the contactless power transmission system 1 of the embodiment, deceleration regenerative energy obtained by the regenerative operation of the rotating electric machine 14 during vehicle deceleration can be stored in the power storage device 11 by including the control device 17 that changes the charging upper limit SOC set for the state of charge (SOC) of the power storage device 11 to decrease as the speed of the vehicle increases. For example, an increase in energy loss in the entire system can be curbed without the need to release deceleration regenerative energy as heat.

The control device 17 can curb occurrence of problems such as heat generation and shortened lifespan of the power storage device 11 by setting the power transmission from the power transmission device 2 to a virtual SOC, in addition to the state of charge (SOC) of the power storage device 11, by making the power balance at the input and output terminals of the power storage device 11 zero and matching the power received by the power reception unit 15 with the power required for driving the vehicle.

Since the control device 17 restricts the power received by the power reception unit 15 by the short-circuiting operation that short-circuits the secondary coil 15*a* of the power reception device 4, the control device 17 can control the current in the power transmission device 2 on the primary side using the power reception unit 15 and the received power conversion unit 16 on the secondary side and can perform independent power control on the secondary side.

MODIFIED EXAMPLE

Hereinafter, modified examples of the embodiment will be described. The same parts as those in the embodiment described above are given the same reference numerals, and the description thereof will be omitted or simplified.

In the embodiment described above, although the contactless power transmission system 1 includes the stored power voltage conversion unit 12 that converts the input and output power of the power storage device 11, the present invention is not limited thereto, and the stored power voltage conversion unit 12 may be omitted.

For example, in the case of a hybrid vehicle or the like that is driven by the power storage device 11 and an internal combustion engine as a power source, the drive control device 3 includes the stored power voltage conversion unit 12, and in the case of an electric vehicle or the like that is driven using the power storage device 11 as a power source, the drive control device 3 does not need to include the stored power voltage conversion unit 12.

The embodiment of the invention is presented by way of example and is not intended to limit the scope of the invention. The embodiment can be implemented in various other forms, and various omissions, substitutions, and changes can be made without departing from the gist of the invention. The embodiment and modifications thereof are included within the scope and gist of the invention as well as within the scope of the invention described in the claims and its equivalents.

What is claimed is:

1. A contactless power transmission system comprising:

a power reception unit configured to receive AC power contactlessly transmitted from a power transmission device in a predetermined power transmission section on a travel path of a vehicle;

a power conversion unit configured to convert the AC power received by the power reception unit into DC power;

a power storage device connected to the power conversion unit;

a rotating electric machine configured to generate a traveling driving force of the vehicle and to transmit and receive power to and from the power storage device; and a control device configured to control an operation of the power conversion unit and to control power transmission and reception between the power storage device and the rotating electric machine, wherein the control device restricts reception of the AC power by the power reception unit when a state of charge of the power storage device is larger than a predetermined threshold value, and wherein the control device restricts the state of charge of the power storage device by changing the predetermined threshold value to decrease as a speed of the vehicle increases so that the state of charge of the power storage device at an end position of the power transmission section becomes in a state where all of regenerative power of the vehicle generated after passing through the power transmission section can be stored in the power storage device.

2. A contactless power transmission system comprising:

a power reception unit configured to receive AC power contactlessly transmitted from a power transmission device in a predetermined power transmission section on a travel path of a vehicle;

a power conversion unit configured to convert the AC power received by the power reception unit into DC power;

a power storage device connected to the power conversion unit;

a rotating electric machine configured to generate a traveling driving force of the vehicle and to transmit and receive power to and from the power storage device; and a control device configured to control an operation of the power conversion unit and to control power transmission and reception between the power storage device and the rotating electric machine, wherein the control device restricts reception of the AC power by the power reception unit when a state of charge of the power storage device is larger than a predetermined threshold value, and wherein the control device maintains the state of charge by making a power balance at the power storage device zero, and matching power received by the power reception unit with power required for the traveling driving force so that the state of charge of the power storage device at an end position of the power transmission section becomes in a state where all of regenerative power of the vehicle generated after passing through the power transmission section can be stored in the power storage device.

3. The contactless power transmission system according to claim 1, wherein the control device restricts reception of the AC power by short-circuiting of the power reception unit.

4. The contactless power transmission system according to claim 2, wherein the control device restricts reception of the AC power by short-circuiting of the power reception unit.

* * * * *